(12) United States Patent
Kay

(10) Patent No.: US 9,475,124 B2
(45) Date of Patent: Oct. 25, 2016

(54) COMPOSITE COMPOSITIONS AND NEW AND NOVEL MACHINE AND CONTACT TOOLS

(71) Applicant: Gregory James Kay, Midland, MI (US)

(72) Inventor: Gregory James Kay, Midland, MI (US)

(*) Notice: Subject to any disclaimer, the term of this patent is extended or adjusted under 35 U.S.C. 154(b) by 0 days.

(21) Appl. No.: 14/522,772

(22) Filed: Oct. 24, 2014

(65) Prior Publication Data

US 2015/0111993 A1    Apr. 23, 2015

Related U.S. Application Data

(60) Division of application No. 13/593,584, filed on Aug. 24, 2012, now Pat. No. 9,120,152, which is a continuation-in-part of application No. 12/228,195, filed on Aug. 12, 2008, now abandoned.

(51) Int. Cl.
| | |
|---|---|
| B24D 3/00 | (2006.01) |
| B24D 3/02 | (2006.01) |
| B24D 11/00 | (2006.01) |
| B24D 18/00 | (2006.01) |
| C09K 3/14 | (2006.01) |
| B23B 29/02 | (2006.01) |
| C08J 5/10 | (2006.01) |
| C08J 5/00 | (2006.01) |
| C08J 5/24 | (2006.01) |
| B82Y 30/00 | (2011.01) |
| B23C 5/00 | (2006.01) |

(52) U.S. Cl.
CPC ............. *B23B 29/022* (2013.01); *B23C 5/006* (2013.01); *B82Y 30/00* (2013.01); *C08J 5/005* (2013.01); *C08J 5/10* (2013.01); *C08J 5/24* (2013.01); *B23B 2226/27* (2013.01); *B23B 2226/275* (2013.01); *B23C 2226/27* (2013.01); *C08J 2363/00* (2013.01); *Y10T 408/94* (2015.01)

(58) Field of Classification Search
USPC .......................................... 51/293, 307, 308
See application file for complete search history.

(56) References Cited

U.S. PATENT DOCUMENTS

| | | | | |
|---|---|---|---|---|
| 6,935,816 B2* | 8/2005 | Lee | ......................... | B23B 29/02 408/144 |
| 2005/0158549 A1* | 7/2005 | Khabashesku | ........ | C01B 31/065 428/403 |
| 2006/0241236 A1* | 10/2006 | Kuznetsov | ............... | C08K 3/04 524/495 |

OTHER PUBLICATIONS

U.S. Appl. No. 13/593,584, filed Oct. 17, 2013, Kay.
U.S. Appl. No. 12/228,195, filed Feb. 19, 2009, Kay.
U.S. Appl. No. 12/070,971, filed Feb. 22, 2008, Kay.

* cited by examiner

*Primary Examiner* — James McDonough

(57) ABSTRACT

Composite compositions and machine and contact tools, for example, metal boring tools and face mills that are manufactured from them. The tools are provided with composite structure to lighten the tools and yet retain the strength and durability of the tool. The novelty resides in the use of additives to certain composites that make up a portion of the tool, especially tool bars.

1 Claim, 5 Drawing Sheets

COMPOSITE COMPOSITIONS AND NEW AND NOVEL MACHINE AND CONTACT TOOLS

This application is a divisional application of U.S. patent application Ser. No. 13/593,584, filed Aug. 24, 2012, pending, which is a continuation-in-part of patent application Ser. No. 12/228,195, filed Aug. 12, 2008, abandoned, which is a U.S. utility application from U.S. Provisional Patent Application No. 60/964,892, filed Aug. 15, 2007, expired, from which priority is claimed. filed Aug. 11, 2008.

BACKGROUND OF THE INVENTION

This invention deals with new and novel composite compositions and machine and contact tools, for example, metal boring tools and face mills that are manufactured from them. The tools are provided with composite structure to lighten the tools and yet retain the strength and durability of the tool. The novelty resides in the use of additives to certain fiber composite materials in the composites that make up a portion of the tool, especially tool bars.

Tool bars for use in mounting cutting tools such as most conventional boring and reaming bars are manufactured to be elongate and thin in order to machine a deep hole in a work product.

Being long and thin often leads to a bendable tool which is not easily tolerated in the industry as it creates low quality products. This bendability and lack of stiffness in the tool leads to chattering and in order to reduce this chattering, the speed of the boring tool is lessened and the feed rates are thus low, leading to low production rates. This problem has plagued the industry for a long time, and many approaches have been taken to provide tools that have high stiffness, less bendability increased dampening, and decreased weight.

For example, various shapes of cutting tools and tool bars for use in mounting the cutting tools have been developed. Many other tool bars for use in mounting cutting tools, which are made of tungsten carbide alloy and tool steel having very excellent stiffness and rigidity characteristics, have been also developed in some countries, However, since it is difficult to machine cemented carbide, there is a disadvantage, in that, manufacturing costs of a tool bar exhibiting optimum performance become very high. Further, since the natural frequency of a boring or reaming bar is low due to high densities of tungsten carbide and tool steel, there is a limitation on improvement, of the cutting speed of the bar to remove metal and create a satisfactory finish. High weight causes several issues such as chatter, ease of use, release of the tool bars from the holder or adapter due to bending owing to the weight of the bar.

In addition, other tools, such as face mills are constructed to be heavy and durable so that they stand up to rigorous high stock removal and it would be advantageous to have such tools that could avoid or substantially avoid such adverse conditions, especially high temperature.

Fiber reinforced composites have an advantage over conventional materials in many applications because of their favorable strength to weight ratios, corrosion resistance, and unique stress coupling properties.

The method of manufacture is important in these fiber reinforced composites. The fiber orientation angle in each stiffness layer is alternated several times along the length of the component, internally, or in combination. Each time the fiber orientation angle is altered, a region of high shear is generated across the damping layer. By controlling the orientation angle, thickness, segment lengths and moduli, significant shearing occurs throughout the viscoelastic layer. Also, since the primary load path through the part is in the composite stiffness layers, the part retains high stiffness.

There are several patents dealing with cutting tools that are manufactured from tool bodies using composites. Once such device in which the body is manufactured from a carbon fiber composite in a curable epoxy resin can be found in U.S. Pat. No. 6,935,816, that issued on Aug. 30, 2005 which is incorporated herein for what it teaches about tool bars and their construction.

It has been discovered by the inventor herein that a portion of the tool can be constructed with the novel materials of this invention in order to reduce their weight yet retain their valuable properties such as strength and low chattering, that is, less or no vibration. This is especially valuable in tool bars.

SUMMARY OF THE INVENTION

One embodiment of this invention is a composite tool body, the composite tool body formed from a composition comprising a curable polymer and nanodiamond.

In another embodiment, this invention comprises a high performance composite tool bar, the tool bar comprising a composite body having a first end and a second end, said first end being capable of having a cutting tool mounted thereon. The second end is capable of being mounted to a driving device. The composite body is constructed from a curable polymer further containing a nanodiamond.

A further embodiment of this invention is the use of a nanodiamond material that is further chemically modified at its surface.

Still further, another embodiment of this invention is a tool body that is a solid composite.

And, another embodiment of this invention is a composite tool body wherein the composite has a central metal core running through it Yet another embodiment of this invention is a composite tool body of this invention having a hollow core running through it.

Another embodiment of this invention is the use of tool bars that have squared, tapered, small radius step downs and tool bars that have surface posts.

Still another embodiment of this invention is a composite tool body of this invention having a metal sheath surrounding it.

A final embodiment of this invention are tool bars having removable heads and tails and mandrel stems as set forth in U.S. patent application Ser. No. 12/070,971, filed on Feb. 22, 2008 which is incorporated herein by reference for what it teaches about such tool bars and their construction and manufacture.

DETAILED DESCRIPTION OF THE DRAWINGS

Figure 1:
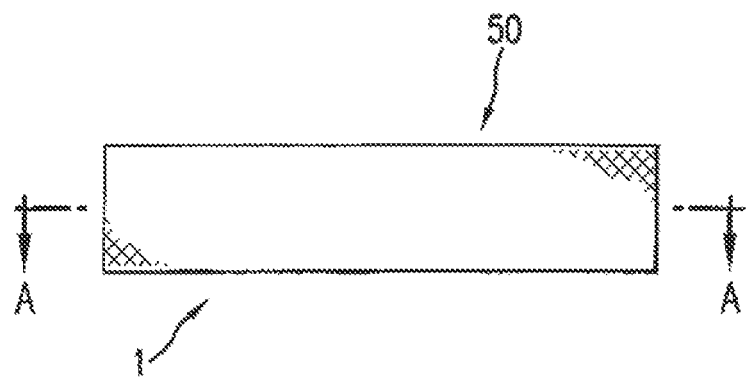
FIG. 1 is full side view of a composite tool body of this invention.
Figure 2:
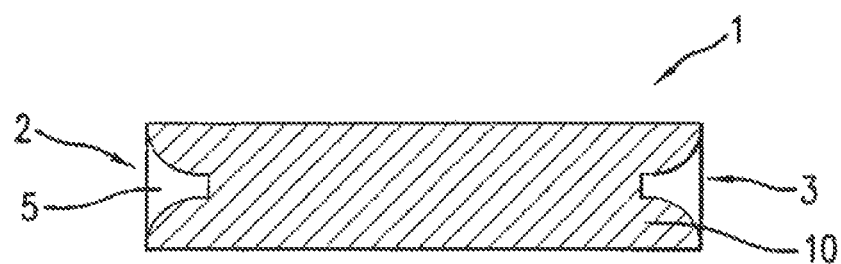
FIG. 2 is a full cross sectional view of the body of FIG. 1 through line A-A of FIG. 1.

Turning now to FIG. 1, which is a fill side view of a composite body 50 of this invention there is shown the wrapped composite 1 without any sheathing. FIG. 2 shows a full cross sectional view of the body 1 of FIG. 1 through line A-A.

The composite is formed from a curable polymer and an additive nanodiamond material 10 described infra and also shown is a first end 2, and a second end 3. In the first end 2, there is a means 4 for mounting a cutting tool (FIGS. 3, 4, and 5) which consists of an opening 5 which accommodates the means 4. The cutting tool can be adhesively mounted in the opening 5, or it can be mounted using threads, pins, screws, bolts or the like, Also, the means 4 can be mounted in the opening 5 by male screw threads 6 (shown in FIG. 4) that mate and thread into female threads 7 (FIG. 3, in phantom) in the back end 8 of the opening 5.

In the second and 3, there is shown a means for mounting an adapter (connection end) 9 that can be used to adapt to a drive means (not shown) for holding and driving the mounting means 4. Like the first end 2, the second end 3 consists of an opening 11 which accommodates the adapter 9. The adapter 9 can be adhesively mounted in the opening 11, or it can be mounted using threads, pins, screws, bolts or the like. Also, the adapter 9 can be mounted in the opening 11 by male screw threads 12 that mate and dread into female threads 13 shown in FIG. 3 in phantom in the back 14 of the opening 11.

Figures 3, 4:
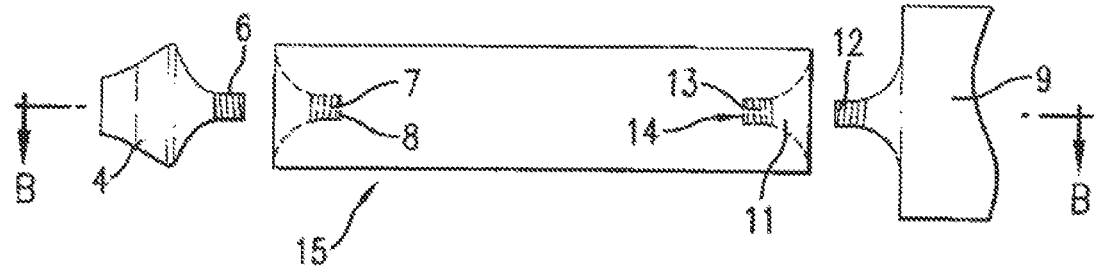
FIG. 3 is a full side view of a high performance machine tool of this invention showing an adapter on the second end and a working tool on the opposite end and sheathed in a metal sheath wherein the cutting tool and the adapter are separated from the body for clarity.
FIG. 4 is a full side view of a cutting tool of this invention.
Figure 5:
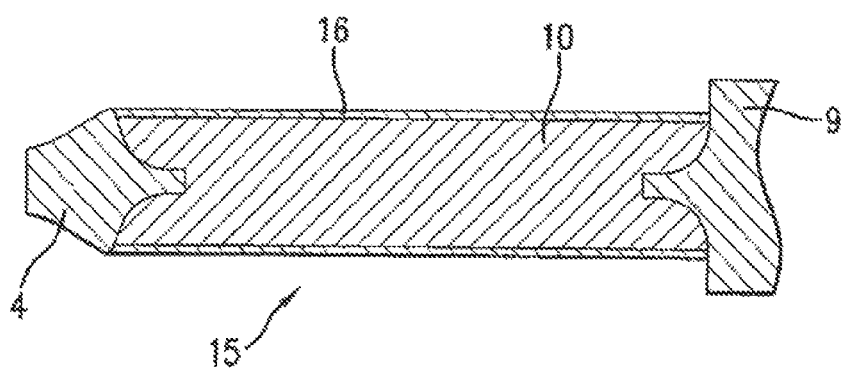
FIG. 5 is a full cross sectional view of the high performance machine tool of FIG. 3 through line B-B showing the cutting tool and the adapter.
Figure 6:
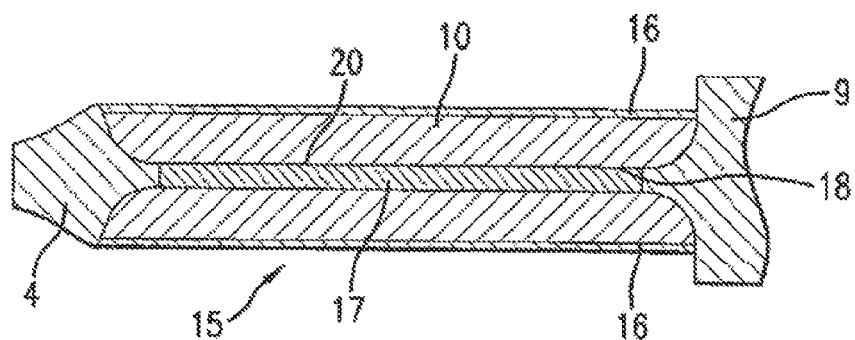
FIG. 6 is a full cross sectional view of the high performance machine tool of FIG. 3 through line B-B also showing a metal bar in the core of the body.
Figure 7:
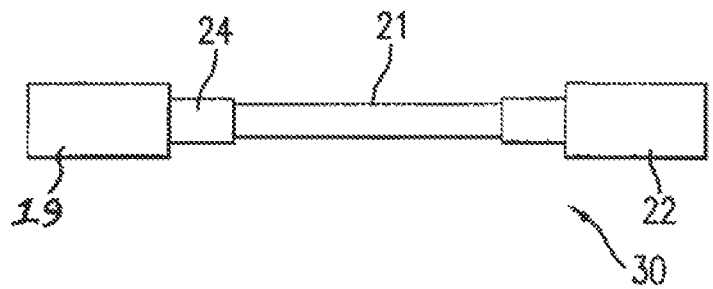
FIG. 7 is a full side view of a tool bar of this invention showing a squared step down configuration.
Figure 8:
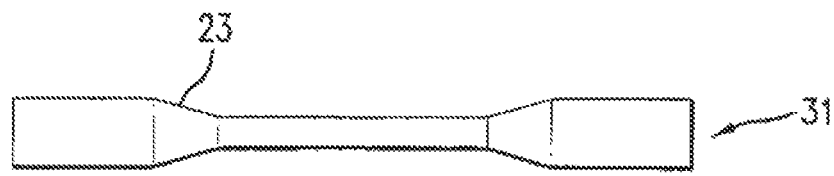
FIG. 8 is a full side view of a tool bar of this invention showing a tapered step down configuration.
Figure 9:
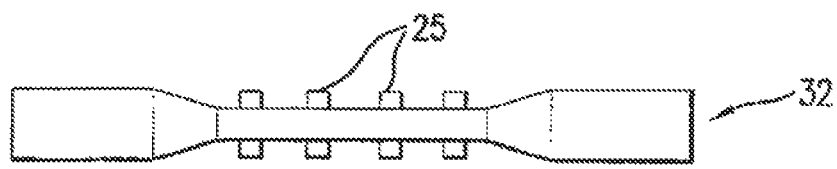
FIG. 9 is a full side view of a posted tool bar of this invention.
Figure 10:
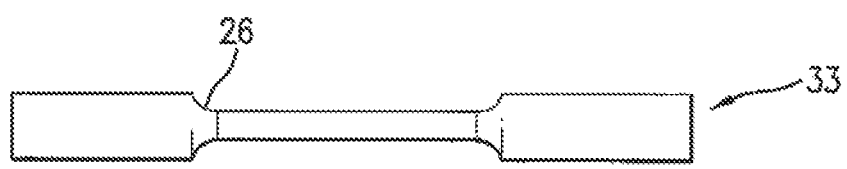
FIG. 10 is a full side view of a tool bar of this invention showing a small radius step down.
Figure 11:
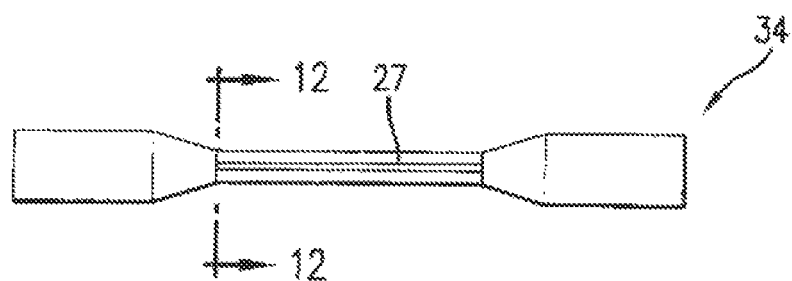
FIG. 11 is a full side view of a tool bar of this invention showing a channeled surface.
Figure 12:
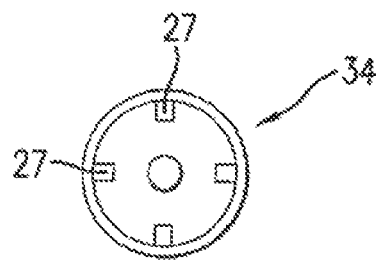
FIG. 12 is a full cross sectional end view of the tool bar of this invention through line 11-11 showing the channeled configuration of the bar.
Figure 13:
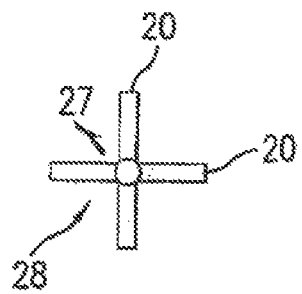
FIG. 13 is a depiction of a four point construction.
Figure 14:
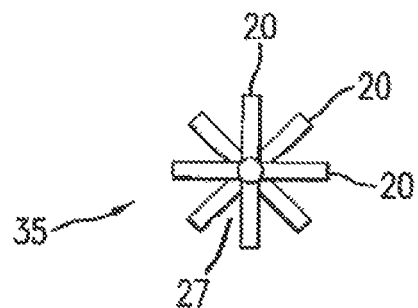
FIG. 14 is a depiction of the configuration of FIG. 13, except in an eight point construction as opposed to the four point construction of FIG. 13.
Figure 15:
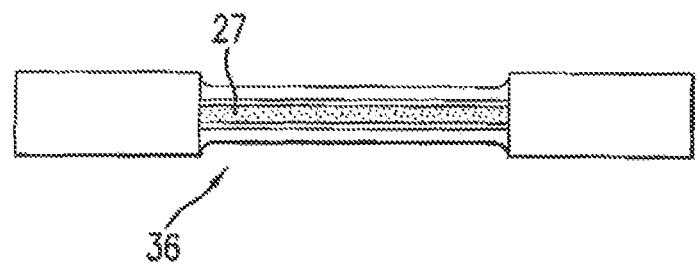
FIG. 15 is full side view of a channeled tool bar of this invention showing the channel.
Figure 16:
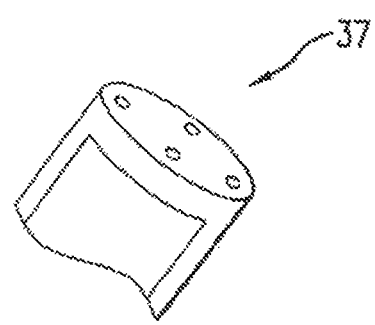
FIG. 16 is a view in perspective of an end cap that is used over the end of the tool bar and is used for attaching a cutting head.
Figure 17:
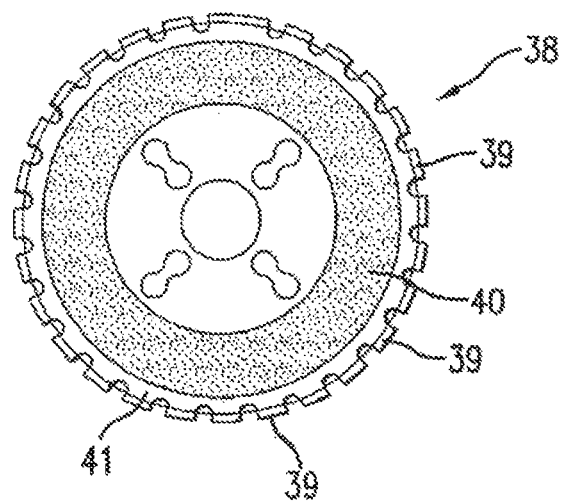
FIG. 17 is a full end view of a face mill tool of this invention showing the position of the composite in the interior of the face mill.

Turning now to FIG. 5 which is a full cross sectional view of a high performance machine tool 15 of FIG. 3 through line B-B showing the Composite body 10, the cutting tool 4, and the adapter 9. Also shown in FIGS. 5 and 6 is a sheathing 16 that covers the composite body 10. The sheathing 16, for purposes of this invention can be manufactured from metal, or can be manufactured from composite materials wherein the preferred metal is steel and the preferred composite materials are fiber reinforced curable materials having fibers (or strands) such as carbon, poly-paraphenylene terephthalamide, polyvinyl alcohol, pitch fibers, pitch nanofibers, PAN and the like.

The sheathing can be compressed, locked, or threaded onto the composite body 10, or can be adhered by using adhesives, said adhesives being well-known to those skilled in the art of tool manufacture.

FIG. 6 is a full cross sectional view of the high performance machine tool 15 of FIG. 3 through line B-B wherein there is also shown a metal bar 17 in the core 18 of the body. The metal bar 17 can be compressed into the core 18, or it can be adhered to the composite body 10, in the core 18, using adhesives 20 well-known to those skilled in the art.

The diamond carbon material used in the composite of this invention and methods for manufacturing such material can be found in U.S. Pat. No. 5,916,955 that issued. on Jun. 29, 1999 and U.S. Pat. No. 5,861,349 that issued on Jan. 19, 1999 to Vereschagin, et al.

The material contains carbon, hydrogen, nitrogen, oxygen and incombustible impurities of a composition specified in the specification thereof, and the material is produced by detonating an oxygen-deficient explosive in a closed volume in a medium inert towards carbon, at a cooling rate of the detonation products of 200 to 600 degrees/minute. The subject matter of those two patents are incorporated herein by reference for what they teach about the material, its production, and it properties.

The curable polymers of this invention are those that are known and commonly used in forming composites. The most popular are the epoxy resins. Standard procedures are used to manufacture the composites and such procedures are well-known to those skilled in the art, the major differences being the use of nanodiamond additives in the curable polymer. It is contemplated within the scope of this invention to use other known fibers in conjunction with the additives of this invention as set forth infra.

"Cutting tools" for purposes of this invention are those known in the art as machine tools and include at least boring tools and face mills.

Sheathing of the body of the inventive device of this invention and the core rod of the body of this invention are preferably manufactured from steel but the invention is not limited to steel. Any material having the requisite stiffness may be used, for example tungsten carbide alloy or fiber reinforced composites. It is also contemplated within the scope of this invention to use plastic materials, such as castable and extrudable urethanes and crosslinked polyethylene and polypropylene.

The body of this invention that contains the core rod can be constructed in several different ways. For example, the cutting tool and the adapter and the core rod may be a unitary piece, or each of the tool and the adapter may be manufactured independently and matching threads in the core rod and the individual adapter and tool can be mated and screwed together. Thereafter, the composite body can be added and cured.

In another embodiment, the composite body can be manufactured around a mandrel or false core. After curing, the false core can be removed and the core rod thereafter inserted in the opening left by the false core. Thereafter, the adapter and the tool end can be mounted in the body and onto the metal rod. Using a false core is the best method to use when the composite is comprised of a film or a tape.

It is known in the art to cement the core rod to the composite body and such is the case herein. Occasionally, depending on the types of materials being used, adhesives may be used to bond the core rod and the composite body together.

Typically, the general method for manufacturing a composite containing boring tool bar is to spin the epoxy resin around the center core until it equals the outside diameter of the boring bar. In the instant invention, the nanodiamond is mixed with the curable polymer. Thereafter, the so-treated nanodiamond is spun around the tool bar to form a winding that is later cured. In this manner, if fiber is also used, the angle of the fiber can be altered from 0 degrees angle to 90 degrees angle. Zero degrees for purposes of this method means that the fiber is laid along the longitudinal long axis of the tool bar. For purposes of this invention, 90 degrees means perpendicular to the long axis of the tool bar.

Tool bars from steel and other metals, as well as certain plastics are used as the basis for the final product. Some configurations for enhancing adhesive strength and reducing vibration in the bars can be found in the Figures.

What is claimed is:

1. A nanodiamond reinforced composite body having a first end and a second end, said end being capable of having a cutting tool mounted thereon; said second end being capable of being mounted to a driving device wherein the nanodiamond composite is constructed from diamond carbon material containing carbon, hydrogen, nitrogen, oxygen and incombustible impurities and wherein the said diamond carbon material contains at least one group, selected from the group consisting of groups, carboxyl groups, lactone groups, aldehyde groups, ether qroups, quinone groups, and combinations thereof and the composite additionally contains a curable polymer.

* * * * *

UNITED STATES PATENT AND TRADEMARK OFFICE
CERTIFICATE OF CORRECTION

PATENT NO.        : 9,475,124 B2
APPLICATION NO.   : 14/522772
DATED             : October 25, 2016
INVENTOR(S)       : Gregory James Kay It is certified that error appears in the above-identified patent and that said Letters Patent is hereby corrected as shown below:

In the Claims

Column 6, Line 7, please insert the word -- first -- after the word "said" and before the word "end".
Column 6, Line 14, please insert the word -- methyl -- after the word "of" and before the word "groups".

Signed and Sealed this
Fourteenth Day of March, 2017

Michelle K. Lee
*Director of the United States Patent and Trademark Office*